DONALD J. HUGHES
INVENTOR.

BY

ATTORNEYS

April 28, 1970  D. J. HUGHES  3,508,947
METHOD FOR SIMULTANEOUSLY APPLYING A PLURALITY OF COATED
LAYERS BY FORMING A STABLE MULTILAYER
FREE-FALLING VERTICAL CURTAIN
Filed June 3, 1968  3 Sheets-Sheet 3

DONALD J. HUGHES
INVENTOR.

BY *Alfred P. Lorenz*
*Walter O. Hodsdon*
*Paul P. Holmes*

ATTORNEYS

United States Patent Office 3,508,947
Patented Apr. 28, 1970

3,508,947
METHOD FOR SIMULTANEOUSLY APPLYING A PLURALITY OF COATED LAYERS BY FORMING A STABLE MULTILAYER FREE-FALLING VERTICAL CURTAIN
Donald J. Hughes, Rochester, N.Y., assignor to Eastman Kodak Company, Rochester, N.Y., a corporation of New Jersey
Filed June 3, 1968, Ser. No. 733,971
Int. Cl. G03c 1/74; B44d 1/12, 1/16
U.S. Cl. 117—34                 24 Claims

ABSTRACT OF THE DISCLOSURE

A coating comprised of a plurality of distinct superposed layers is applied to the surface of an object by forming a stable multilayer free-falling vertical curtain, in which individual layers may be formed from the same or different liquid coating compositions, and directing the object so that the free-falling curtain impinges thereon. Apparatus for carrying out this method includes means for moving the object to be coated at the desired speed and one or more coating hoppers adapted to form a plurality of flowing layers of liquid coating composition and to bring these layers into face-to-face contact with one another to form a composite layer which is directed onto the moving object as a free-falling vertical curtain. This method and apparatus are employed with particular advantage in the manufacture of multilayer photographic elements, such as photographic film or paper.

BACKGROUND OF THE INVENTION

Field of the invenion

This invention relates in general to the coating art and in particular to a method and apparatus for coating an object with a plurality of simultaneously applied layers of liquid coating composition. In a particular embodiment, the invention relates to the manufacture of photographic elements comprising a support coated with a plurality of layers of photographic coating composition.

There are many instances in which it is desired to coat the surface of an object with a plurality of distinct superposed layers. For example, a very common commercial operation involves application to an article of a prime coat, an undercoat, and a surface coat of paint. A further common example is in the manufacture of photographic elements, such as photographic film or paper, wherein a number of layers, often as many as ten or more, of different photographic coating compositions must be applied in distinct layer relationship on a suitable support, with the uniformity of thickness of each layer being controlled within very close tolerances. By means of the method and apparatus disclosed herein, these coating operations are carried out in such manner that the superposed layers are simultaneously applied to the object to be coated, i.e., a composite layer made up of a plurality of distinct layers in face-to-face contact is formed and deposited on the object so that a plurality of layers is applied in a single coating operation, as contrasted with a sequential coating procedure in which one layer is coated, a second layer is coated on top of the first layer, a third layer is coated on top of the second layer, and so forth. While the invention is specifically illustrated herein with reference to the manufacture of photographic elements, it will be appreciated that it is of much wider application and can be utilized to advantage in numerous fields, wherever it is desired to effect simultaneous application of two or more distinct superposed layers of liquid coating composition.

Description of the prior art

One method of coating an object with a plurality of distinct superposed layers is to utilize a sequential coating operation including a partial or complete drying of each layer before the next succeeding layer is applied. This, of course, is a costly and time-consuming procedure, particularly where the number of layers which must be applied is large, and may require considerable duplication of coating and drying equipment.

A practical alternative to the use of sequential coating is the use of multilayer bead coating, a method which has found widespread use in the manufacture of photographic elements. For details of this method of coating and the apparatus employed therein, reference is made to the teachings of United States Patents 2,761,419 and 2,761,791. Briefly, in this method the surface of the web to be coated is moved across and in contact with a bead or puddle in which individual layers of coating composition exist in distinct layer relationship and as a result of such contact there is deposited on the moving web a coating made up of a plurality of distinct superposed layers. The coating composition is continuously fed to the bead from a multiple slide hopper, or other suitable coating hopper, at a rate at least as great as it is removed by the moving web and, in order to maintain the bead, the lip of the hopper is positioned in close proximity to the surface of the moving web.

The multilayer bead coating method, while a great advance in the art and of great valve, has certain limitations which restrict its use. Thus, the width and uniformity of the gap between the surface of the web being coated and the lip of the hopper are quite critical. In the manufacture of photographic elements, this gap must be very narrow, i.e., of the order of 0.02 to 0.04 centimeter and thus only slightly greater than the wet thickness of the layer of coating composition applied to the support. Such close spacing between the hopper and the support to be coated has greatly complicated the manufacture of photographic elements. For example, this close spacing has resulted in excessive waste of product due to interruptions in the coating operation caused by a splice in the web passing the coating point. If the thickness of the splice is too great to permit it to pass the coating point, then the hopper must be backed off to allow the splice to pass and then be returned to its operative position to reform the bead. On the other hand, even though the spacing is great enough to allow the splice to pass the coating point, its passage may disturb or disrupt the bead and alter the thickness and uniformity of the coating applied until the bead is properly re-established. In either case, re-establishment of the bead to give the desired coating takes some time and when high coating speeds are used a considerable length of product can be wasted during such periods. Furthermore, the close spacing which is necessary for stability of the bead allows minute particles or air bubbles which are present in the coating composition to be momentarily caught between the lip of the hopper and the support to form defects in the coating known in the photographic art as "pencil lines." Also, variations in the thickness of the support itself can be sufficient to alter the size and/or shape of the coating bead to such an extent as to introduce irregularities in the thickness of coating applied to the support.

Other limitations on multilayer bead coating also restrict its usefulness. For example, it is not adapted to the coating of individual or discrete sheets moved through the coating bead in succession by reason of the fact that the bead would be repeatedly broken and reformed as the sheets move therethrough. Furthermore, in multilayer bead coating the operable range of coverage, viscosity, and coating speed is not as broad as would be desirable. For example, to operate at high coating speeds it is ordinarily necessary to reduce the viscosity of the coating composition by diluting it with water or other liquid medium. However, the greater the extent of dilution the greater the amount of liquid which must be subsequently removed. Accordingly, the capacity of commercially practical drying equipment places practical limits on the extent to which the viscosity of the coating composition can be lowered by dilution while still permitting the coating to be dried, particularly when high coating speeds, as are now common in the photographic industry, are utilized. Thus, there are many instances where photographic coating compositions, because they are of higher viscosity than the viscosity most suitable for bead coating, cannot be handled by this method in an economical and convenient manner. Furthermore, multilayer bead coating is restricted to a greater extent than is desirable with respect to the orientation of the layers depending on their relative thicknesses and the viscosity of the different coating compositions involved. For example, for best results with this method it is preferred that the bottom layer be relatively thick and formed from a coating composition of relatively low viscosity, whereas the desired orientation and thickness of the layers in a particular product may not be in accord with this requirement.

It is toward the objective of providing a method of coating an object, especially a photographic support, with a plurality of simultaneously applied distinct superposed layers, which overcomes or avoids the disadvantages and limitations of the multilayer bead coating method heretofore employed, that this invention is directed.

SUMMARY OF THE INVENTION

In copending commonly assigned United States patent application Ser. No. 733,944, entitled "Method and Apparatus for Production of Photographic Elements" and filed June 3, 1968, in the name of Jack F. Greiller, there is disclosed and claimed a method of making a photographic element in which the support is coated by forming a free-falling vertical curtain of liquid photographic coating composition and causing this curtain to impinge on the face of the moving support to apply a thin layer of the coating composition thereto. The aforesaid patent application, the disclosure of which is incorporated herein by reference, pertains to coating with a free-falling vertical curtain which is in the form of a single layer so as to apply a single layer of coating composition to the support, it thereby being necessary to subject the support to sequential coating, i.e., each layer being applied successively, in order to produce a multilayer element. In accordance with the present invention, it has been discovered that a free-falling vertical curtain made up of a plurality of distinct layers in juxtaposed face-to-face relationship can be formed and utilized to simultaneously apply to a moving object, such as a photographic support, a coating made up of a plurality of distinct superposed layers. This was an unexpected and surprising discovery since one would reasonably conclude that two or more juxtaposed layers of liquid coating composition would not maintain distinct layer relationship during free fall but would intermix and, further, that even if such relationship could be maintained during free fall, the layers would become intermixed upon impingement of the falling curtain on the moving object. In fact, when a multilayer free-falling vertical curtain is established and directed onto a moving object in accordance with the teachings hereinafter set forth, substantially no intermixing between adjacent layers occurs and a multilayer coating is produced which functions in a fully equivalent manner to that produced by sequential coating of each layer on top of the preceding layer.

In accordance with this invention, an object is coated with a plurality of simultaneously applied layers of coating composition by a method comprising the steps of moving the object along a path through a coating zone; forming a plurality of separate flowing layers, i.e., two or more, of liquid coating composition; flowing these layers into face-to-face contact with one another to form a composite layer; and forming from the composite layer a free-falling vertical curtain which extends transversely of the coating path and impinges on the moving object. As described hereinafter in full detail, the respective layers can be composed of the same or different liquid coating compositions and the layers can be oriented in any desired manner with wide variation permissible in relative thicknesses and/or differences in the viscosities of the different liquid coating compositions. In a particular embodiment of this invention, the method is applied to coat liquid photographic coating compositions on photographic supports to produce multilayer photographic elements.

The present invention also includes within its scope apparatus for carrying out the coating method disclosed herein. Such apparatus includes means for moving the object to be coated along a path through a coating zone, means for forming a plurality of flowing layers of liquid coating composition, means for flowing these layers into face-to-face contact with one another to form a composite layer, and means for forming from such composite layer a free-falling vertical curtain which extends transversely of the coating path and impinges on the moving object. In a preferred embodiment, the apparatus includes a multiple slide hopper having a downwardly inclined slide surface and providing a plurality of separate horizontally disposed slots spaced one above the other along this surface from which the respective coating liquids are expelled so that they form a composite layer as they flow down the surface, the composite layer falling by gravity over the lower edge or lip of the slide surface to form a free-falling vertical curtain. The downwardly inclined slide surface supports the flowing coating composition for acceleration by gravity at a rate less than acceleration in free fall and tends to minimize variations in thickness in the flowing layers. Advantageously, means are also provided for varying the vertical spacing between the hopper lip and the object moving along the coating path, and thereby regulating the height of the free-falling curtain, for varying the speed at which the object to be coated is moved through the coating zone, and for varying the rate at which the respective liquid coating compositions forming the respective layers are supplied to the hopper.

DESCRIPTION OF THE PREFERRED EMBODIMENTS

Figure 1:
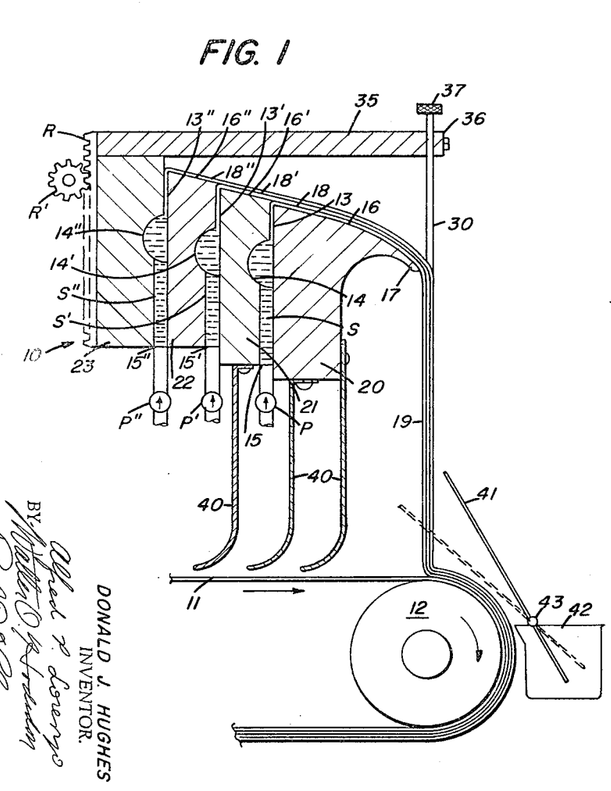
FIGS. 1 and 2 are, respectively, vertical cross sectional and front elevational views of coating apparatus in accordance with this invention.
Figure 2:
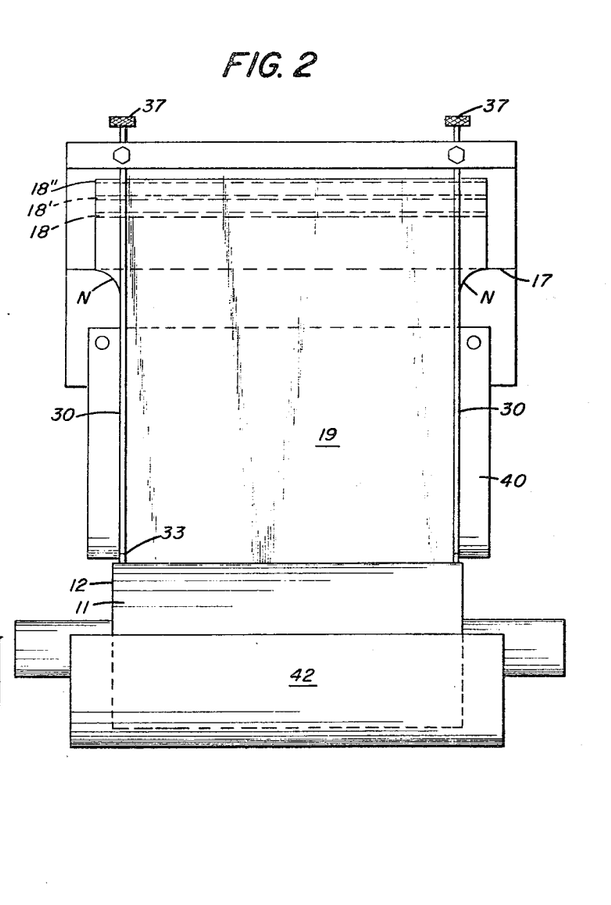

Referring to FIGS. 1 and 2, there is shown an apparatus for simultaneously applying three layers of coating composition to the surface of a moving support in superposed distinct layer relationship in accordance with this invention. The support which is coated is a continuous web 11 which is moved along a coating path by suitable means including a coating roller 12 which rigidly supports web 11 and smooths it out while also reversing its direction of movement. Located above the coating path is a triple-slide hopper 10 having a cavity 14 into which a liquid coating composition S is pumped at a constant rate by a metering or constant discharge pump P through inlet 15. Coating composition S flows from cavity 14 through a narrow elongated vertical slot 13, which is of uniform slot width, and thence onto a downwardly inclined slide surface 16 which terminates in a lip 17 located directly above coating roller 12. Coating composition S flows by gravity down inclined surface 16 as a flowing layer 18 wherein the coating composition is accelerated by gravity at a rate less than acceleration in free fall. In consequence, layer 18 attains an almost exactly uniform flow by the time it reaches and falls off lip 17 to form one layer of multilayer free-falling vertical curtain 19 which impinges on the surface of web 11 passing around coating roller 12. Free-falling curtain 19 can be directed along a path intersecting the axis of coating roller 12, as shown, or along a path which is spaced to either side of the axis, as desired, but it will be appreciated that curtain 19 should not be so far off axis with respect to coating roller 12 that the direction of travel of web 11 at impingement is so far from horizontal as to detrimentally affect the coating operation. To ensure that curtain 19 falls cleanly, lip 17 terminates in a relatively sharp undercut edge as shown.

Second and third liquid coating compositions S' and S'' are pumped at a constant rate into second and third cavities 14' and 14'' by second and third metering or constant discharge pumps P' and P'' through inlets 15' and 15'' respectively. From cavities 14' and 14'', coating compositions S' and S'' flow through narrow vertical slots 13' and 13'', respectively, and thence onto downwardly inclined slide surfaces 16' and 16'', respectively, down which they flow in the form of layers 18' and 18''. Slide surfaces 16, 16' and 16'' can be substantially coplanar or they can be offset relative to each other by an amount substantially equal to the thickness of the flowing layers 18, 18' and 18''. In either instance, flowing layer 18'' will flow onto the top of layer 18' and then layers 18' and 18'' will flow gravitationally down slide surface 16' in combined layer relationship without intermixing and then onto the top of layer 18. From this point, the three layers 18, 18' and 18'' will flow gravitationally down slide surface 16 in combined layer relationship without intermixing and will leave lip 17 to form multilayer free-falling vertical curtain 19. Impingement of free-falling vertical curtain 19 on moving web 11 takes place without intermixing of the layers and deposits on web 11 a coating made up of three distinct superposed layers corresponding to layers 18, 18' and 18''.

Hopper 10 can be made from a single block of metal so that slide surfaces 16, 16' and 16'' make up a single slide surface divided into separate portions by slots 13, 13' and 13'', but from the standpoint of milling out the cavities and slots it is much more practical to construct it in the form of several individual blocks. Accordingly, hopper 10 has been shown as formed of four individual blocks, designated by numerals 20 to 23, which are suitably machined so that when they are assembled as shown, the slide surfaces, cavities, vertical slots and inlets will be formed. These individual blocks are held in assembled relation by any suitable means (not shown), for example, bolts or clamps. In the event the coating compositions used are of the type which must be heated or cooled in order to keep them in a suitable fluid condition, the hopper can be provided with interconnected conduits (not shown) through which a fluid heating or cooling medium can be circulated.

To permit adjustment of the height of multilayer free-falling vertical curtain 19, for reasons which will be discussed more fully below, hopper 10 is mounted so that it can be adjusted vertically relative to the coating path and for this purpose is provided with adjusting means comprising a rack R on the hopper engaged by a pinion R'. To shield curtain 19 from disruptive ambient air currents and to reduce the entrainment of air between curtain 19 and the surface of web 11, hopper 10 is also provided with one or more air shields 40, three such shields mounted in tandem being shown in FIG. 1. Each of these air shields has a scoop-shaped end which is positioned as close to the surface of web 11 as possible without contacting it so as to remove air being carried along with the web and reduce the air barrier which free-falling curtain 19 must penetrate. It will be appreciated that as the position of hopper 10 with respect to moving web 11 is altered the length or position of air shields 40 should be changed accordingly to maintain them closely adjacent to web 11.

As shown in FIGS. 1 and 2, two spaced vertical edge guides 30 extend from adjacent lip 17 to just above the coating path. These edge guides aid in the formation of free-falling vertical curtain 19 and serve to define its width at impingement onto the face of web 11. Edge guides 30 are spaced so as to cause the edges of layers 18, 18' and 18'' to "neck-in," as shown at N in FIG. 2, to engage them, but this is not essential and they may be spaced apart a distance substantially equal to the width of layers 18, 18' and 18'' if desired.

Figure 3:
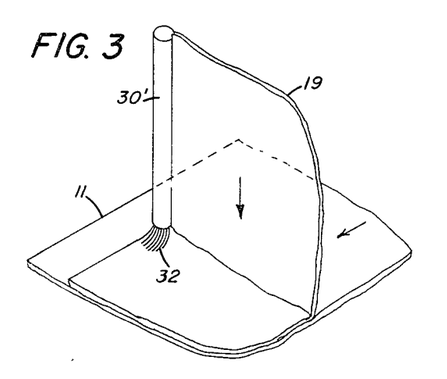
FIGS. 3 and 4 are perspective views of two different embodiments of edge guides for the multilayer free-falling vertical curtain of this invention.
Figure 4:
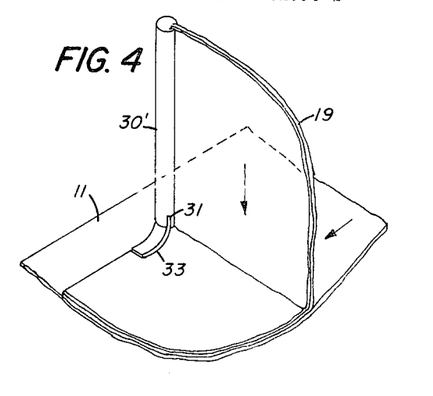

In order to spread the coating liquid flowing from the lower ends thereof, the edge guides are advantageously provided with end portions of the type shown in FIGS. 3 and 4. Referring first to FIG. 3, each edge guide 30' comprises a rod or wire whose ends terminate just short, e.g. 0.3 to 0.6 centimeter, of the surface of web 11. Fixed to and extending vertically downward from the lower end of edge guide 30' is a trailing brush 32 composed of a few hairs extending 1.25 centimeters below the end of the edge guide so that they engage and ride on the surface of web 11 and are spread out in the direction of movement of web 11 as shown. These brushes tend to spread out any excess coating composition adjacent the longitudinal edges of free-falling curtain 19. By use of edge guides of this type, the full width of the web can be coated without waste of any coating composition. Moreover, an uncoated region or regions can be provided transversely of the web by using edge guides to divide the free-falling vertical curtain into two or more separate curtains each of which is narrower than the support to be coated. FIG. 4 illustrates a preferred embodiment of the edge guide shown in FIG. 3. In this modification, edge guide 30', in the form of a small rod of suitable material such as stainless steel, has an axial slot 31 in its lower end into which is fitted a strip 33 of a flexible, resilient material. Each edge guide is oriented so that the strip 33 riding on the surface to be coated is splayed laterally toward the edges of the web so as to facilitate spreading out of the excess coating composition which tends to accumulate at the edges of the web. To render the edge guides rotatably adjustable, hopper 10 is provided with a cap 35 extending thereover, as shown in FIG. 1, and supports a clamping bar 36 at its end in vertical alignment with lip 17. Clamping bar 36 serves to retain the edge guides in a selected position transversely of hopper 10 and in a vertical position relative to coating roller 12. Each edge guide is provided with a knob 37 whereby it can be rotated so as to vary the angular trailing relation of strip 33 relative to the path of the web.

As also shown in FIG. 1, a sheet deflector 41 is mounted for movement into a position between edge guides 30 and positioned so that the bottom end thereof extends into catch tray 42. Deflector 41 is pivoted at 43 to move between an inoperative position, shown in full lines in FIG. 1, wherein free-falling curtain 19 impinges upon the surface of web 11 and an operative position, shown in broken lines, wherein it intercepts curtain 19 and directs it into tray 42. This deflector is used to reduce the quantity of wasted support generated during starting and stopping of a coating operation. Thus, at start-up considerable time is sometimes required to obtain a satisfactory stable curtain having the desired flow rate and to bring the web up to the desired coating speed. After these conditions are satisfied, the deflector is moved to its inoperative position where it remains until the coating operation is stopped, at which time it is returned to its operative position. In an alternate embodiment, deflector 41 can be slideably mounted rather than pivotally mounted and is then preferably positioned so as to intersect free-falling curtain 19 just above web 11.

In some applications of the method of this invention, the edge guides are spaced apart to form a free-falling curtain which is wider than the web to be coated. In these instances, the edge guides extend below the opposite edges of the web and catch trays are positioned under the web to collect the overflow of coating composition. The advantage of such an arrangement is that a coating of exactly uniform thickness is applied right out to the edges of the support even though the free-falling curtain is, under typical operating conditions, slightly thicker at its edges than over the main portion of its width. Applications in which this arrangement is particularly useful include those where the multilayer free-falling curtain is made up of two or more layers of the same coating composition, those where the coating compositions used are so inexpensive that waste thereof is not a significant cost factor, and those where the coating compositions used are of such nature that they can be easily separated and recirculated for use.

Figure 5:
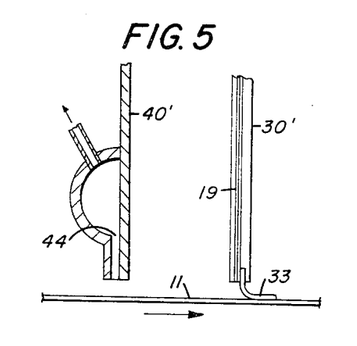
FIG. 5 is a diagrammatic side view, partly in section and partly in elevation, of an embodiment of an air shield incorporating a vacuum extractor for removing entrained air from the surface to be coated.

In FIG. 5, there is shown an alternate form of air shield which can be employed in the method of this invention. Air shield 40' is straight rather than curved like the air shields previously described and is provided with a vacuum manifold 44 which is positioned adjacent the web to be coated and connected to a vacuum pump (not shown) to withdraw air therefrom as indicated by the arrow. With this arrangement, the multilayer free-falling vertical curtain 19 is shielded from ambient air currents, and air entrained by the moving web is drawn off before curtain 19 impinges thereon. FIG. 5 also includes an edge guide 30' provided with a trailing strip 33, as hereinbefore described.

Figure 6:
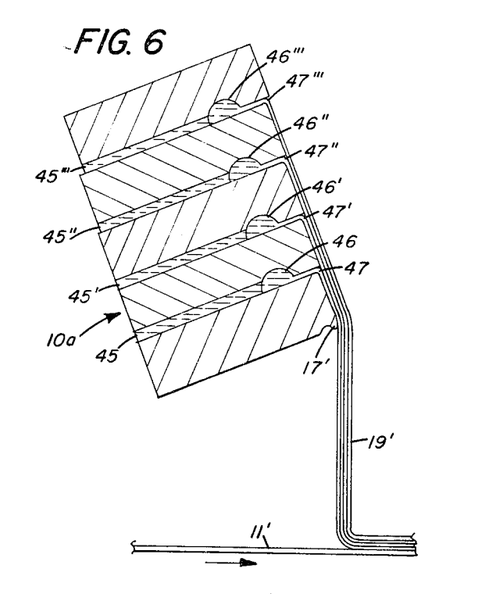
FIGS. 6 and 7 are vertical cross sections of alternate forms of coating hoppers in accordance with this invention.

In FIG. 6, a four-slide hopper 10a is shown for simultaneously coating four layers of the same or different liquid coating compositions onto the surface of a continuous support 11'. Hopper 10a has four separate inlets 45, 45', 45" and 45'" into which four liquid coating compositions, respectively, are pumped at rates proportional to the final thickness of each coated layer desired. The coating compositions flow from their respective cavities 46, 46', 46" and 46'" through elongated narrow slots and thence from discharge slots 47, 47', 47" and 47'" onto respective slide surfaces which are substantially coplanar. As in the case of the three-slide hopper described hereinabove, the four coating compositions are formed into separate flowing layers, each of which becomes of a uniform thickness across its width, which become superposed on top of one another as they flow down the slide surfaces. As they leave the hopper lip 17' the juxtaposed layers form a vertical curtain 19' which undergoes free fall and then impinges upon moving support 11'.

Figure 7:
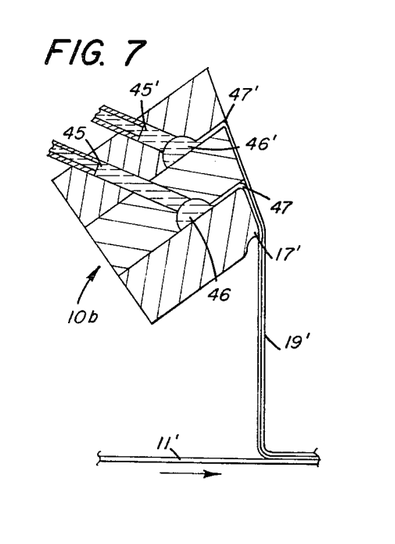

FIG. 7 shows a dual slide hopper 10b for forming a two-layer curtain. Since operation of this hopper is the same as the hopper shown in FIG. 6, except that two instead of four liquid coating compositions are simultaneously applied, no further description is necessary. The two coating compositions and their associated paths are designated by the same reference characters as for two of the compositions shown in FIG. 6. It will be observed that, except for the number of liquids being coated, the hoppers of FIGS. 6 and 7 differ from the hopper shown in FIG. 1 primarily in the inclination of the slide surfaces from the vertical. In order to achieve optimum coating results in a given situation it may be desirable to adjust the inclination of the slide surfaces to regulate the velocity of the flowing layers, depending on such factors as the physical properties of the liquids being coated and the desired thickness of the coated layers. It will be observed that the steeper the inclination of the slide surfaces the less pronounced lip 17 need be to insure a clean flow of the composite layer therefrom.

Figure 8:
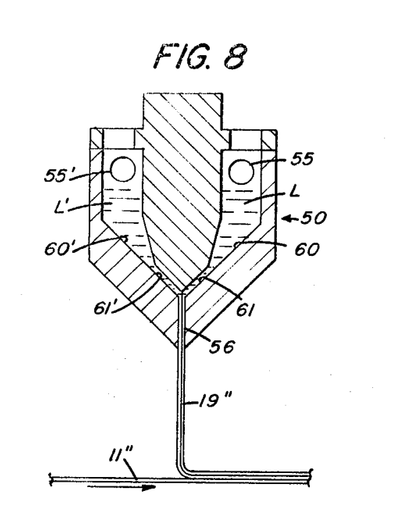
FIG. 8 is a vertical cross section of a different form of hopper for forming a two-layer coating in accordance with this invention.

FIG. 8 illustrates an extrusion-type coating hopper constructed to permit simultaneous coating of two layers of liquid coating composition onto the surface of a moving support. As shown, hopper 50 is provided with two separate inlets 55 and 55' through which two liquid coating compositions L and L' respectively, are pumped into chambers 60 and 60' at a constant rate which is proportional to the desired final thickness of each coated layer. The two coating compositions pass through separate restricted slots 61 and 61' and form separate flowing layers. In discharge slot 56 these layers are brought into juxtaposed face-to-face relation without turbulence or intermixing. Upon leaving discharge slot 56, the composite layer formed therein undergoes free fall so that a two-layer free-falling vertical curtain 19" impinges on the surface of support 11". The support is moved along a coating path beneath hopper 50 at a uniform speed commensurate with the desired thickness of coating deposited thereon. Depending on the nature of the coating compositions and the desired wet thicknesses of the layers coated, the liquid coating compositions are either fed from the hopper under pressure, or, as shown, they are fed into hopper cavities which are open to the atmosphere. In this latter arrangement, the individual layers are formed and discharged from the hopper solely by gravitational force. When low viscosity liquids are fed into and from an extrusion-type hopper under high pressure, they are subject to incipient turbulence upon flowing through the restricted discharge slot. Thus, when such liquids are used, and particularly when they are to be formed into very thin layers such as in the manufacture of photographic elements, it is desirable to operate an extrusion-type hopper under a fixed head rather then to feed the liquids therethrough under high pressure.

Figure 9:
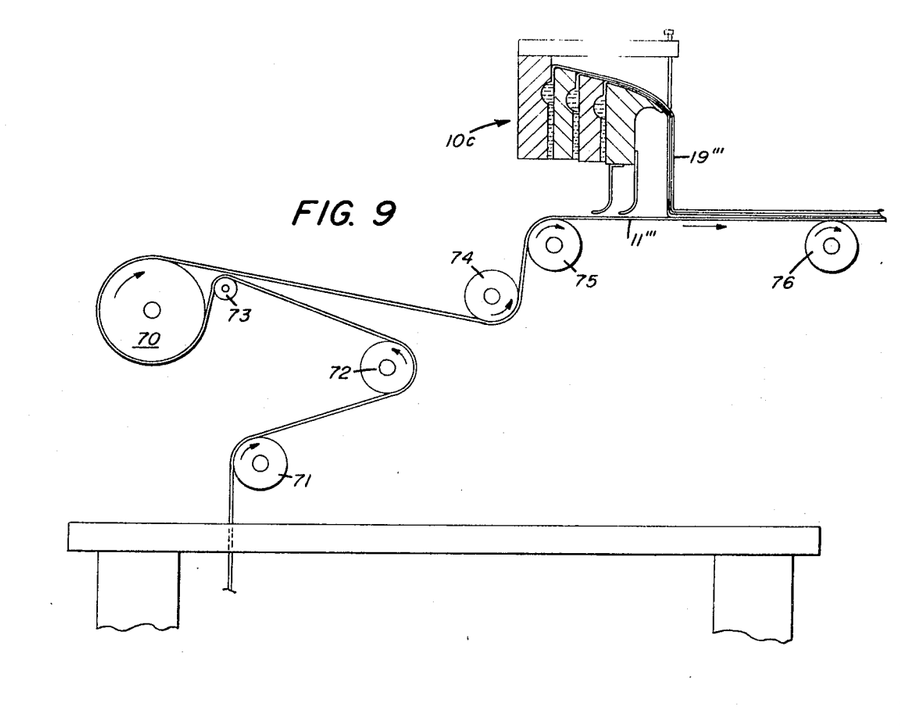
FIG. 9 is a schematic side elevation of an alternate embodiment of coating apparatus in accordance with this invention.

Referring now to FIG. 9 there is shown an arrangement wherein the multilayer free-falling vertical curtain is applied to a moving web in a region between supporting rollers, it being noted, however, that in manufacturing photographic elements, it is preferred to use the arrangement hereinbefore described in which the curtain impinges on the moving web directly above the supporting roller. As shown, a multiple-slide hopper 10c, similar to the hoppers previously described, is positioned above moving web 11'" and a three-layer free-falling vertical curtain 19'" is directed so as to impinge upon the surface of web 11'". The web is pulled from a supply roll (not shown) by a relatively large driving roll 70 after being passed over guide rolls 71, 72 and 73, the latter of which is so disposed as to maintain a substantial wrap of the web around the driving roll. From driving roll 70 the web passes in succession around rolls 74 and 75 and thence over guide roll 76 to a suitable drying section (not shown). The web is pulled into the drying section by a drive roll, not shown, whose speed relative to that of drive roll 70 is such that the reach of web extending between guide rolls 75 and 76 is placed under sufficient tension to stabilize it as it passes through the coating zone. Guide roll 74 is positioned in relation to guide roll 75 in such manner as to reduce the amount of air which would otherwise be entrained between the surface of web 11'" and free-falling vertical curtain 19'". Thus, the sharp change in direction which the web is caused to make just ahead of the coating zone reduces the tendency of the web surface to carry air to the coating zone. Also, since guide roller 74 rolls on the surface of the web being coated, it acts as a "squeegee" to remove air from the web surface. This action can be enhanced by driving guide roll 74 in a direction opposite to that in which the web is advanced. Of course, some web surfaces would be damaged by such contact with a roll and in such instances this method of reducing the air barrier on the web would not be practical.

If it is desired to coat discrete sheets rather than a continuous web, the apparatus of FIG. 9 can be readily adapted to this purpose by substituting for web 11''' an endless conveyor belt on which discrete sheets are conveyed through the coating zone. In this embodiment, the offset in the coating path ahead of the coating zone would ordinarily be eliminated by running the conveyor belt from the drive roll 70 to guide roll 75, thus bypassing guide roll 74.

The method and apparatus of this invention can be utilized to coat any material or mixture of materials which can be put in liquid form, for example, in the form of a solution, a dispersion, or a suspension. In many instances where this method finds application, the coating composition is an aqueous composition but other liquid vehicles of either an organic or inorganic nature, can also be utilized and are fully within the contemplation of this invention. The respective layers can be formed of the same or different liquid coating compositions and these coating compositions can be either miscible or immiscible with one another. While the method is particularly advantageous in coating the surfaces of flat objects, it is not so limited and can be utilized with objects of other geometry, it being apparent, however, that while the coating thickness will be the same at all points on a surface of given inclination it will differ as between surfaces of different inclination. Moreover, the object to be coated may be in the form of a continuous web or sheet or it may be a discrete sheet or small article carried through the coating zone on a conveyor belt.

In addition to use in the manufacture of photographic elements, the method and apparatus of this invention find application in many other areas of the coating art, for example, in application of a plurality of layers of paint to machine parts, in application of multilayer resin coatings to wood or metal panels, in manufacture of mineral coated paper which requires two or more coated layers, in application of polymer latices to textile fabrics in which separate layers of different polymers are desired to impart particular properties to the product, in application of an outer layer of polymer composition over a subbing layer which promotes its adhesion to the surface coated, and so forth.

As indicated hereinbefore, the method and apparatus of this invention are especially useful in the photographic art for manufacture of multilayer photographic elements, i.e., elements comprised of a support coated with a plurality of superposed layers of photographic coating composition. The number of individual layers may range from two to as many as ten or more. In the photographic art, the liquid coating compositions utilized are of relatively low viscosity, i.e., viscosities from as low as about 2 centipoises to as high as about 150 centipoises, or somewhat higher, and most commonly in the range from about 5 to about 100 centipoises. Moreover, the individual layers applied must be exceedingly thin, i.e., a wet thickness which is a maximum of about 0.015 centimeter and generally is far below this value and may be as low as about 0.0001 centimeter. In addition the layers must be of extremely uniform thickness, within the maximum variation in thickness uniformity being plus or minus five percent and in some instances as little as plus or minus one percent. In spite of these exacting requirements, the method of this invention is of great utility in the photographic art since it permits the layers to be coated simultaneously while maintaining the necessary distinct layer relationship and fully meeting the requirements of extreme thinness and extreme uniformity in layer thickness.

The method and apparatus of this invention are suitable for use with any liquid photographic coating composition and can be employed with any type of photographic support and it is, accordingly, intended to include all such coating compositions and supports as are utilized in the photographic art within the scope of these terms, as employed herein and in the appended claims.

The term "photographic" normally refers to a radiation sensitive material, but not all of the layers presently applied to a support in the manufacture of photographic elements are, in themselves, radiation sensitive. For example, subbing layers, pelloid protective layers, filter layers, antihalation layers, etc. are often applied separately and/or in combination and these particular layers are not radiation sensitive. The present invention relates also to the application of such layers, and the term "photographic coating composition" as employed herein, is intended to include the compositions from which such layers are formed. Moreover, the invention includes within its scope all radiation sensitive materials, including electrophotographic materials and materials sensitive to invisible radiation as well as those sensitive to visible radiation. While, as mentioned hereinbefore, the layers are generally coated from aqueous media, the invention is not so limited since other liquid vehicles are known in the manufacture of photographic elements and the invention is also applicable to and useful in coating from such liquid vehicles.

More specifically, the photographic layers coated according to the method of this invention can contain light-sensitive materials such as silver halides, zinc oxide, titanium dioxide, diazonium salts, light-sensitive dyes, etc., as well as other ingredients known to the art for use in photographic layers, for example, matting agents such as silica or polymeric particles, developing agents, mordants, and materials such as are disclosed in United States Patent 3,297,446. The photographic layers can also contain various hydrophillic colloids. Illustrative of these colloids are proteins, e.g. gelating; protein derivatives; cellulose derivatives; polysaccharides such as starch; sugars, e.g. dextran; plant gums; etc.; synthetic polymers such as polyvinyl alcohol, polyacrylamide, and polyvinylpyrolidone; and other suitable hydrophillic colloids such as are disclosed in United States Patent 3,297,446. Mixtures of the aforesaid colloids may be used, if desired.

In the practice of this invention, various types of photographic supports may be used to prepare the photographic elements. Suitable supports include film base, e.g. cellulose nitrate film, cellulose acetate film, polyvinyl acetal film, polycarbonate film, polystyrene film, polyethyene terephthalate film and other polyester films; paper; glass; cloth; and the like. Paper supports coated with alpha-olefin polymers, as exemplified by polyethylene and polypropylene, or with other polymers, such as cellulose organic acid esters and linear polyesters, may also be used if desired. The support can be in the form of a continuous web or in the form of discrete sheets, but in commercial practice it will most frequently take the form of a continuous web.

Various types of surfactants can be used to modify the surface tension and coatability of photographic coating compositions in accordance with this invention. Useful surfactans include saponin; non-ionic surfactants such as polyalkylene oxides, e.g. polyethylene oxides, and the water-soluble adducts of glycidol and alkyl phenol; anionic surfactants such as alkylaryl polyether sulfates and sulfonates; and amphoteric surfactants such as arylalkyl taurines, N-alkyl and N-acyl beta-amino propionates; alkyl ammonium sulfonic acid betaines, etc. Illustrative examples of useful surfactants of these types are disclosed in British Patent 1,022,878 and in United States Patents 2,739,891; 3,026,202 and 3,133,816.

To enhance the uniformity of the coated layers applied to the surface of the support in accordance with this invention it is, in some instances, also desirable to modify the surface characteristics of the support. Thus, certain supports have surfaces which are not readily wet by certain coating compositions and where this is the case the uniformity of the coated layers can be significantly improved if the surface of the support is prewet before it reaches the coating zone. This prewetting operation does not necessarily require the application of a liquid to the surface, as the term might imply, but may include steaming the surface, passing it through a vacuum chamber in the presence of steam, etc. This prewetting tends to reduce the air barrier on the surface of the support as well as to reduce any natural repellency the surface may have for a given coating composition.

To increase the support velocity at which good coating results can be obtained, means are preferably provided, in accordance with this invention, to reduce the thickness of the boundary layer of air at the surface of the support immediately before the support passes through the free-falling vertical curtain. This air barrier varies with the surface characteristics of the support, generally being greater for rough surfaces than for smooth ones, as evidenced by the fact that photographic film base presents a lesser air barrier to the coating liquid than photographic paper. Also, the air barrier is found to be greater for high support velocities than for low ones, probably because of the fact that more air is entrained between the support and the free-falling curtain as the speed of the support increases. Means for reducing the air barrier at the surface of the support, e.g., air shields, have been described hereinbefore and are illustrated in the drawings.

The use of edge guides, as illustrated herein, is advantageous in the method of this invention as they aid in forming a stable multilayer free-falling vertical curtain and serve to determine its width at impingement onto the surface of the object being coated. The edge guides can be of any suitable geometry, for example, wires, cylindrical rods, or flat rectangular strips.

It should be noted that more than one hopper can be utilized to form the multilayer free-falling vertical curtain, if desired. Thus, for example, two or more separate hoppers positioned adjacent to and horizontally spaced from one another can be employed to form free-falling vertical curtains of different liquid coating compositions which are directed onto a downwardly inclined slide surface, located just below the hoppers, where they unite to form a flowing composite layer which falls from the lip of the slide surface as a multilayer free-falling vertical curtain.

Generally speaking, it will be most practical and convenient in the practice of this invention to orient the moving support with respect to the free-falling curtain so that the support moves along a horizontal plane within the coating zone. However, this is not essential and the support can be moved along a path such that the direction of travel is inclined upwardly or downwardly from the horizontal or along a path which is skewed or which is canted about its longitudinal axis as long as the deviation from horizontal is not so great that the composition flows after coating to render the coated layers excessively non-uniform.

When the method and apparatus of this invention are utilized in the manufacture of multilayer photographic elements, operation should be in accordance with the limitations and relations between operating variables set forth in the copending United States patent application Ser. No. 733,944, reference to which has been made hereinbefore, in order to ensure that the coated layers meet the requirements of thinness and uniformity essential in photographic elements. Thus, to ensure stability of the multilayer free-falling vertical curtain the total flow rate of coating composition, i.e., the combined flow rate of all of the different coating compositions making up the respective layers, should be at least about 0.5 cubic centimeter per second per centimeter of curtain width. To ensure uniformity of thickness in each layer the flow rate of coating composition forming each respective layer must be uniform over substantially all of such portion of the width of the free-falling curtain as is coextensive with the support. To achieve this uniformity the means employed to generate the free-falling curtain should preferably function in such manner that the momentum of the liquid at the start of free fall is low and, more specifically, should preferably provide a downward velocity as the liquid enters the curtain of less than about 20 centimeters per second and, more preferably, less than about 10 centimeters per second. In order to provide the extremely thin layers required in photographic elements, the ratio of the flow rate of coating composition forming any individual layer, measured in cubic centimeters per second per centimeter of curtain width, to the velocity of the support, measured in centimeters per second, should be less than about 0.015.

In accordance with this invention, a plurality of distinct superposed layers of coating composition are simultaneously applied to the surface of an object by forming a plurality of separate flowing layers of liquid coating compositions, flowing these layers into juxtaposed face-to-face contact with one another to form a composite layer (the term "composite layer" being employed herein to mean a layer made up of two or more individual layers in distinct layer relationship), and forming from this composite layer a free-falling vertical curtain in which distinct layer relationship is maintained. To maintain the desired distinct layer relationship it is necessary that conditions causing turbulence be avoided. More specifically, in accordance with the teachings set forth herein, the individual layers are formed so that laminar flow is maintained in at least the surface portions thereof and they are brought into contact to form the composite layer in such manner as to provide non-turbulent liquid-to-liquid interfaces. The composite layer then undergoes free fall without intermixing of the individual layers occurring and when the hereinbefore described relationship between flow rate of coating composition and support velocity is maintained, upon impingement onto the surface of the support the layers are deposited in distinct superposed relation without any significant degree of intermixing occurring. Of course, by virtue of the forces acting on the multilayer free-falling curtain it will decrease in thickness as it falls, i.e., the velocity of the falling liquid will increase as a result of gravitational force so that the thickness of the curtain must decrease proportionately. Nonetheless, the distinct relationship of the layers is maintained and their thicknesses remain proportionately the same with respect to one another as originally established.

The combined wet thickness of the layers of coating composition deposited on the moving support will be the same as the thickness of the multilayer free-falling curtain just before impingement where the velocity of the support is equal to the impingement velocity. On the other hand, where the velocity of the support is greater than the impingement velocity then the combined wet thickness of the layers deposited will be less than the thickness of the curtain just before impingement, with greater and greater support velocities resulting in correspondingly thinner and thinner coatings. High support velocities are permissible since the multilayer free-falling curtain will remain essentially vertical, rather than being pulled out in the direction the support is traveling, as long as the momentum of the curtain at impingement is sufficient to break the air barrier present on the surface of the moving support and the coating composition readily wets the support surface. Accordingly, there is no apparent upper limit on the velocity at which the support can be advanced except as dictated by practical considerations. Operation at speeds of several hundred centimeters per second and up to as high as about 1500 centimeters per second or even higher is entirely feasible. Where the velocity at which the support is moved is less than the impingement velocity of the multilayer free-falling curtain the wet thickness of the layers of coating composition deposited on the support will be greater than the thickness of the curtain just before impingement. If this difference in velocity is not too great a uniformly thick coating can still be attained, until finally a point is reached where the free-falling curtain will fold back upon itself and thereby result in non-uniformity in coating thickness which would render the photographic element useless. The point at which the free-falling curtain will fold back upon itself is reached much sooner with coating compositions of low viscosity, e.g. 5 centipoises, than with coating compositions of higher viscosity, e.g. 100 centipoises. In accordance with this invention, satisfactory results with photographic coating compositions are ensured by operating within the limit on ratio of flow rate to support velocity hereinbefore disclosed. Where the method of this invention is utilized in fields other than manufacture of photographic elements, so that uniformity in coating thickness is less critical, then the use of somewhat lower support velocities than are utilized in making photographic elements is sometimes feasible.

The height of the free-falling curtain, i.e., the distance over which free fall occurs, can be varied widely depending on the nature of the specific application involved and the characteristics of the coating compositions. In selecting the optimum height, an important criterion is that the height be made as small as is practical because the longer the free-falling curtain the more susceptible it is to being affected by ambient air currents causing flutter of the curtain and resultant non-uniformity in the product. However, the height must also be selected in accordance with the requirement that the free-falling curtain have adequate momentum at impingement to effectively penetrate or displace the air barrier and adhere to the moving support. To this end, it is desirable that the coating apparatus provide for adjustment of the height of free fall over a substantial range. The air barrier will vary with such factors as the character of the surface to be coated, the effectiveness of mechanical means utilized to remove entrained air, and the velocity at which the support is advanced. Also, since momentum is the product of velocity and mass, if the flow rate of the coating composition is reduced, while maintaining a fixed support velocity, the height of free fall should, in general, be increased so as to increase the impingement velocity and give the free-falling curtain sufficient momentum to penetrate the air barrier. Under typical conditions in the practice of this invention, the height of the free-falling curtain will be in the range from about 5 to about 20 centimeters, but operation at smaller or greater heights than this is also fully within the contemplation of this invention.

In the practice of this invention, the individual layers making up the multilayer free-falling curtain can be in any desired orientation regardless of the physical characteristics of the respective coating compositions or the thickness of the individual layers. The flow rates of the coating compositions forming the layers are, accordingly, independently variable and the ratio of the flow rate of coating composition forming the thickest layer to the flow rate of coating composition forming the thinnest layer can be as high as 50 to 1, or more.

In a preferred embodiment of this invention, the multilayer free-falling curtain is formed with outer layers having substantially the same surface tension, as this has been found to provide improved curtain stability as compared to the situation where the surface tensions of the outer layers differ. This can, of course, be achieved by forming the outer layers of the multilayer curtain from the same coating composition. However, where this is not feasible in view of the orientation and composition of layers dictated by the requirements of the product, the surface tension of the two outer layers can be equalized by adding to the coating composition forming one or both of these layers an appropriate amount of surfactant. The time required for the layers to flow down the slide surfaces of a multi-slide hopper is sufficient for the surfactant to diffuse to the air-liquid interface and act to lower the surface tension.

Since the stability of a free-falling curtain of coating composition is dependent upon the total flow rate, it is apparent that in a multilayer curtain the individual layers can be thinner than would be permissible if they were to be coated individually by the free-falling curtain technique. Moreover, the use of a multilayer curtain is not restricted to simultaneous coating of layers of different coating compositions but can, in some instances, be utilized to advantage to coat a plurality of layers of the same coating composition. For example, it is frequently advantageous to coat a relatively thick layer of coating composition by forming several separate layers, combining these layers in a free-falling vertical curtain, and impinging this curtain onto the surface of a moving support. The formation of "slot lines," which sometimes appear in a coating when it is discharged as a single layer from a single-slot extrusion-type hopper, is effectively avoided by this means. Furthermore, where a surfactant is needed to achieve the necessary curtain stability, the amount which has to be added can be so large as to adversely affect the chemical properties of the coating composition if the surfactant is added to the entire volume of coating composition utilized. This problem is effectively avoided by incorporating the surfactant only in the outer layers of a multilayer curtain since the amount of surfactant then required is much less. In the case where a single coating composition is involved, it can be split into three parts and the surfactant added only to the parts making up the outer layers. Since these outer layers can be very thin, for example less than $\frac{1}{20}$ of the total thickness of the curtain, the amount of surfactant utilized can be very small.

In the manufacture of photographic elements by coating of aqueous protein-containing compositions, it is sometimes advantageous to "set" the wet coating prior to the drying operation. One way of accomplishing this chemically is taught by United States Patent 2,652,345 which discloses adding an aldehyde to the coating composition and then fuming the coating with gaseous ammonia to rapidly "set" it. The method of this invention permits "setting" of the coating in a more direct and convenient manner without the need to provide ammonia in a gaseous form and without fouling of the coating apparatus. Suppose, for example, that two different protein-containing coating compositions are to be applied to the surface of a support. Using the method of this invention and employing a multiple-slide hopper for forming the composite layer and free-falling curtain, an aldehyde, e.g., formaldehyde is incorporated in one of the coating compositions and ammonia is incorporated in the other. When the two layers are brought together the ammonia and formaldehyde diffuse throughout both layers with the result that the liquids "set" simultaneously soon after they are deposited on the moving support. Fouling of the coating apparatus by reason of the reaction is avoided since the required diffusion through the layers takes some time and they can be brought into contact as, or just before, free fall commences. When edge guides are used, it is preferred that the layer containing the ammonia have an ammonia-free band of coating composition along each edge in order to minimize the tendency toward fouling of the edge guides.

A particularly useful application of this invention is in the manufacture of photographic elements in which certain of the individual layers contain one or more color couplers. Photographic products of this type frequently comprise a large number of individual layers, e.g., ten or more, which must be maintained in distinct layer relationship and the method and apparatus of this invention permit all of these layers to be simultaneously applied to the support.

The method of this invention is especially advantageous in the manufacture of photographic elements in view of the wide range of choice it permits in regard to orientation of the different layers. Thus, the layer adjacent the support can be thicker or thinner than the other layers, as desired, and can be formed from a coating composition of greater or lesser viscosity than the other coating compositions. Moreover, orientation of the layers is readily changed by changing the flow system so that the liquids are directed into different cavities within the multi-slide hopper. Additional versatility is provided by the fact that the position of the hopper relative to the moving support can be varied as desired to facilitate coating of the individual layers in a desired orientation with respect to one another. Suppose, for example, that it is desired to produce a two layer coating with coating composition A in the outer layer and coating composition B in the layer immediately adjacent the support. Using a dual-slide hopper positioned in the manner shown in FIG. 7, coating composition A would be fed to cavity 46' and flow from slot 47' and coating composition B would be fed to cavity 46 and flow from slot 47, so that the flowing layer of composition A would flow onto the top of the flowing layer of composition B. In the event this arrangement tends to give unsatisfactory results, for example because composition A will not flow smoothly on the slide surface associated with slot 47', the coating operation can be modified so that the flowing layer of composition B will flow onto the top of the flowing layer of composition A and still retain the desired orientation of layers on the support, i.e., composition B immediately adjacent the support. This is readily accomplished by swinging the hopper around through a 180 degree change in position, so that the slide surfaces slope downwardly to the left, rather than downwardly to the right as in the illustration of FIG. 7, and then changing the pumping system so that composition A is pumped to cavity 46 and composition B to cavity 46'. In each instance, the direction of movement of the support would be the same as is illustrated in FIG. 7. It should also be noted that the orientation of the two layers can be reversed, i.e., the top layer can be made the bottom layer, without changing the pumping system either by reversing the direction in which the support moves while keeping the hopper in a fixed position or by swinging the hopper around through an angle of 180 degrees while keeping the direction in which the support is moved the same.

A further important advantage of the method of this invention, as it applies to the photographic art, is that skip and mottle problems which are frequently encountered in making photographic elements by bead coating are effectively avoided. These problems are associated with poor wetting characteristics between the coating composition and the support and in bead coating become worse as web speed is increased. It is believed that the method of this invention avoids these problems because of the momentum of the free-falling curtain which facilitates even application of the coating composition to the support even at very high web speeds.

The invention is further illustrated by the following examples of its practice. In the examples, surfactant A is saponin at a concentration of 15 percent in water and surfactant B is a 6 percent solution in water of an anionic alkyl substituted aryl oxyalkylene ether.

EXAMPLE 1

Using a dual extrusion-type hopper as illustrated in FIG. 8 to form the free-falling vertical curtain and a coating arrangement as illustrated in FIG. 9, a two-layer coating was made on 7.62 cm. wide paper moving at 800 cm./sec. The bottom layer was 10% aqueous gelatin solution (25 cps.) and the top layer was a black and white silver halide emulsion having a viscosity of 30 c.p.s. The saponin content of each was 4.5 g./1000 cc. Both layers were coated to give a wet coverage of 13.8 g./sq. meter. A photomicrograph of a cross section of the dried coating showed a distinct separation between the two layers.

EXAMPLE 2

Using the same apparatus as in Example 1, two photographic emulsions having incorporated color couplers were coated simultaneously on 7.62 cm. wide paper moving at a speed of 1000 cm./sec. The lower layer had a viscosity of 70 c.p.s. at 40° C. and the upper a viscosity of 41 c.p.s. at 40° C. Saponin was used in each of the coating compositions at a concentration of 4.5 g./1000 cc. Each layer was coated for a spread of 16.1 g./sq. meter. A cross section of the dried coating revealed good separation between the layers.

EXAMPLE 3

Using the same apparatus as in Example 1, two layers of coating composition were coated simultaneously onto a 70 mm. wide film base moving at 235 cm. per second. The bottom layer had a coverage of 6.3 g./sq. meter and was a solution of 7% gelatin and chemically fogged silver having a viscosity of 23 c.p.s. at 35° C. The top layer, coated at a wet coverage of 76.3 g./sq. meter, was a 10% gelatin solution having a viscosity of 30 c.p.s. at 40° C. Saponin was used in each coating composition at a concentration of 1.5 g./1000 cc. A cross section of the dried coating showed good separation between the layers.

EXAMPLE 4

Two layers were simultaneously coated onto a 7.62 cm. wide paper support moving at 550 cm./sec. with a multiple-slide hopper of the type shown in FIG. 7. The bottom layer was a 5% dyed gelatin solution having a viscosity of 7.5 c.p.s. at 40° C. and was coated at a wet coverage of 1.69 g./sq. meter. The top layer was a 10% gelatin solution having a viscosity of 31 c.p.s. at 40° C. and was coated at a wet coverage of 25.75 g./sq. meter. The saponin level of both layers was 1.5/g./1000 cc. A cross section of the dried coating showed good layer separation.

EXAMPLE 5

Three layers were coated simultaneously onto a 70 mm. wide film base moving at a speed of 500 cm./sec. using a multiple-slide hopper of the type shown in FIG. 1. The top and bottom layers were 10% gelatin solutions having a viscosity of 30 c.p.s. at 40° C. and were coated at a wet coverage of 18 g./sq. meter. The middle layer was a black and white silver halide gelatin emulsion having a viscosity of 45 c.p.s. at 40° C. and was coated at a wet coverage of 3.5 g./sq. meter. The saponin concentration for all three coating compositions was 1.5 g./1000 cc. Cross sections of the dried coating showed good separation between the layers.

EXAMPLE 6

A three-layer coating was made on 7.62 cm. wide paper moving at 788 cm./sec. using a multiple-slide hopper of the type shown in FIG. 1. The top and bottom layers were a black and white silver halide gelatin emulsion having a viscosity of 45 c.p.s. at 40° C. and were each coated at a wet coverage of 0.7102 g./sq. meter. The middle layer was a 10% gelatin solution having a viscosity of 30 c.p.s. and coated at a wet coverage of 22.7 g./sq. meter. Surfactant A at a concentration of 1.5 g./1000 cc. was used in the middle layer. Surfactant B at a concentration of 1 g./1000 cc. was used in the top and bottom layers. A cross section of the dried coating showed good separation between the layers.

EXAMPLE 7

A four-layer coating was made on 70 mm. wide film base moving at 500 cm./sec. using a multiple-slide hopper of the type shown in FIG. 6. The bottom and third layers were a 10% gelatin solution having a viscosity of 31 c.p.s. at 40° C. and were coated at a wet coverage of 18 g./sq. meter. The second and top layers were a black and white silver halide gelatin emulsion having a viscosity of 45 c.p.s. at 40° C. and were coated at a wet coverage of 3.18 g./sq. meter. Surfactant A was used in layers 2, 3, and 4 at a concentration of 1.5 g./1000 cc. and the top layer contained 1 g./1000 cc. of surfactant B. A cross section of the dried coating showed good layer separation.

EXAMPLE 8

Two layers were coated simultaneously onto a 7.62 cm. wide paper stock moving at 750 cm./sec. using a multiple-slide hopper of the type shown in FIG. 7. Both layers were of a 10% gelatin solution containing 1.5 g./1000 cc. of surfactant A and had viscosities of 30 cps. at 40° C. The wet coverage for each layer was 10.6 g./sq. meter. The lower layer contained 1 cc./1000 cc. of formaldehyde and the upper layer contained 130 cc./1000 cc. of 50 g./1000 cc. ammonia. The combined layers coated uniformly and set a short distance from the coating point and good layer separation was achieved.

EXAMPLE 9

A multiple-slide hopper similar to that illustrated in FIG. 1 was employed to effect simultaneous application of three layers formed from aqueous gelatin solutions. The width of the flowing layers was 19.59 cm., the edge guides were spaced 17.78 cm. apart and located symmetrically with respect to the flowing layers to give a curtain width of 17.78 cm., and the lip of the hopper was spaced 15.24 cm. above the coating roller. Operating conditions were as follows:

*Bottom layer.*—12% gelatin solution (33 cps. at 96° F.) containing 3.3 g./1000 cc. surfactant A; flow rate 0.25 cc./sec./cm. width of curtain.

*Middle layer.*—6% gelatin solution containing a black silver suspension (7 cps. at 96° F.) and containing 6.6 g./1000 cc. of surfactant A; flow rate 0.71 cc./sec./cm. width of curtain.

*Top layer.*—12% gelatin solution containing 10 g./1000 cc. of surfactant A; flow rate 0.25 cc./sec./cm. width of curtain.

Coatings were made onto glass plates, sheets of film base and sheets of paper at a support velocity of 250 cm./sec. and showed good layer separation.

EXAMPLE 10

Using the apparatus described in Example 9, a three-layer coating was formed under the following conditions:

*Bottom layer.*—12% gelatin solution (31 cps. at 95° F.) containing 3.3 cc./1000 cc. of surfactant A; flow rate 0.59 cc./sec./cm. width of curtain.

*Middle layer.*—12% gelatin solution containing a black silver suspension (31 cps. at 95° F.) and containing 6.6 cc./1000 cc. of surfactant A; flow rate 0.3 cc./sec./cm. width of curtain.

*Top layer.*—12% gelatin solution (31 cps. at 95° F.) containing 10 cc./1000 cc. of surfactant A; flow rate 0.59 cc./sec./cm. width of curtain.

This coating was applied to webs of film base and paper in continuous 30 meter lengths at support velocities of 250 cm./sec. and 500 cm./sec. The uniformity of thickness was plus or minus 1 percent along the 30 meter length of the webs and the coating showed good layer separation.

EXAMPLE 11

Using apparatus similar to that illustrated in FIG. 1 but with a six-layer hopper in place of the three-layer hopper shown, a six-layer coating was produced under the following conditions:

| Layer | Coating liquid | Saponin | Additive | Flow rate (cc./sec./cm.) |
|---|---|---|---|---|
| 1 | 10% gel | 3.3 cc./1,000 cc | 45 g./1,000 cc. yellow pigment. | 0.43 |
| 2 | do | 6.6 cc./1,000 cc | None | 0.15 |
| 3 | do | 10 cc./1,000 cc | 53 g./1,000 cc. red pigment. | 0.28 |
| 4 | do | 13.3 cc./1,000 cc | None | 0.31 |
| 5 | do | 16.6 cc./1,000 cc | 26 g./1,000 cc. blue pigment. | 0.18 |
| 6 | do | 20 cc./1,000 cc | None | 0.27 |

Coatings were made on film base and paper in continuous lengths of 30 meters at support velocities of 250 cm./sec. and 500 cm./sec. and showed good layer separation.

EXAMPLE 12

A six-layer color print material (coating compositions of approximately 80 cps. throughout) of the type described in Example 2 of United States Patent 2,956,879 was coated, using the same apparatus as in Example 11 above, under the following conditions.

| Layer | Flow rate (cc./sec./cm.) |
|---|---|
| 1 | 0.37 |
| 2 | 0.051 |
| 3 | 0.22 |
| 4 | 0.026 |
| 5 | 0.292 |
| 6 | 0.083 |

This coating was applied to film base in a continuous length of 179 meters at a speed of 150 cm./sec. and showed good layer separation.

EXAMPLE 13

A three-layer coating was made using apparatus similar to that shown in FIG. 1 with a hopper having a width of 10 cm. and with a free-fall height of 10 cm. The coating was applied to sheets of paper 7.6 x 25.4 cm. in size moved through the coating zone at a speed of 125 cm./sec. under the following conditions:

*Bottom layer.*—12% gelatin solution (33 cps. at 96° F.) containing 3.3 cc./1000 cc. saponin and coated at a flow rate of 0.26 cc./sec./cm. of curtain width.

*Middle layer.*—6% gelatin solution containing a black silver suspension (7 cps. at 96° F.) containing 6.6 cc./1000 cc. saponin and coated at a flow rate of 0.53 cc./sec./cm. of curtain width.

*Top layer.*—0.5% carboxymethyl cellulose solution (46 cps. at 96° F.) containing 11 cc./1000 cc. saponin and coated at a flow rate of 0.53 cc./sec./cm. of curtain width.

A cross section of the dried coating showed good separation between the layers.

EXAMPLE 14

A two-layer coating was applied to a 7.62 cm. wide cellulose acetate film support moving at a speed of 75 cm./sec. using a dual slide hopper of the type shown in FIG. 7. The coating composition forming the top layer was an aqueous composition having a viscosity of 44 cps. at 40° C. and containing 3.8% of a copolymer composed of 80 percent ethyl acrylate and 20 percent acrylic acid; while the composition forming the bottom layer was the same except that it also contained a silver bromoiodide gelatin emulsion at a concentration of 10 grams per 1000 cc. Both compositions contained 2.01 g./1000 cc. of a p-tert-octyl phenoxy ethoxy ethyl sulfonate sodium salt. The top layer was coated at a wet coverage of 65 g./sq. meter and the bottom layer at a wet coverage of 153 g./sq. meter. Good separation between the layers was achieved.

EXAMPLE 15

A similar two-layer coating to that described in Example 14 was applied under the same conditions except that a dispersion of yellow colloidal silver was included in the top layer to distinguish between layers more easily and the bottom layer contained 6% of the copolymer and had a viscosity of 50 cps. at 40° C. The top layer was coated at a wet coverage of 87 g./sq. meter and the bottom layer at a wet coverage of 113 g./sq. meter. Good separation between the layers was again achieved.

EXAMPLE 16

A cyan dye-developer dispersion, of the type described in United States Patent 2,983,606, having a viscosity of 4 cps. at 40° C. was pumped through a dual slide hopper of the type shown in FIG. 7 simultaneously with a 10% gelatin solution having a viscosity of 30 cps. at 40° C. to form a two-layer free-falling vertical curtain 10.16 cm. wide. Both compositions contained 2.01 g./1000 cc. of a p-tert-octyl phenoxy ethoxy ethyl sulfonate sodium salt. The coating was applied to a 7.62 cm. wide cellulose acetate film support moved at a speed of 75 cm./sec. with the dye-developer dispersion as the top layer and the gelatin solution as the bottom layer. The wet coverage of the top layer was 90.5 g./sq. meter and of the bottom layer 143 g./sq. meter. A photomicrograph of a cross section of the dried coating showed good separation between the layers.

EXAMPLE 17

A two-layer coating was applied from the same compositions described in Example 16 but the orientation of the layers was reversed so that the gelatin solution was the top layer and the dye-developer dispersion was the bottom layer, and the flow rates were changed so that the wet coverage of the top layer was 103 g./sq. meter and of the bottom layer was 21.6 g./sq. meter. Good separation of the layers was again achieved.

The examples presented hereinabove demonstrate that the method and apparatus of this invention permit simultaneous application of two or more layers of liquid coating composition to the surface of a support in distinct superposed relation.

It should be noted that the method of this invention has many important advantages as compared to the method of multilayer bead coating now in widespread use in the photographic industry. For example, discrete supports can be coated in succession by the method of this invention, whereas bead coating is applicable only to the coating of a continuous support since discrete supports would render it impossible to maintain a stable bead. A further advantage of the method of this invention is that the moving support is spaced at a considerable distance below the lip of the hopper so that splices in a continuous web can pass without detrimental effect and so that the uniformity of thickness of the coating applied is not affected by thickness differences or surface irregularities in the support itself. Also, in view of this wide spacing, the problems arising in bead coating as a result of small particles or bubbles being trapped between the lip of the hopper and the support are completely avoided. A further important advantage of the method of this invention is that it permits much greater flexibility in the choice of coating parameters. Thus, for example, in bead coating the speed at which the web can be advanced is dependent on the viscosity of the coating composition and to employ high web speeds it is ordinarily necessary to lower the viscosity of the coating composition by diluting it with water or other liquid. As a consequence, the amount of water which must be removed in the drier is increased and the practical limitations involved in the drying step severely restrict the extent to which coating speed can be increased in this manner. On the other hand, with the method of this invention, the support can be advanced at high speeds using coating compositions of the viscosity ordinarily encountered in the photographic art to provide coated layers of extreme thinness. There is thus no need to dilute the coating composition to go to high coating speeds and the drying problems caused by such dilution in the practice of bead coating are completely avoided. A still further advantage is the much greater flexibility provided with respect to orientation and relative thickness of the layers by the method of this invention, as compared to the method of multilayer bead coating known to the art.

The invention has been described in detail with particular reference to preferred embodiments thereof, but it will be understood that variations and modifications can be effected within the spirit and scope of the invention as described hereinabove and as defined in the appended claims.

I claim:
1. A method of coating an object with a plurality of layers of coating compositions, comprising the steps of (1) moving said object along a path through a coating zone, (2) forming a plurality of flowing layers of liquid coating compositions, (3) flowing said layers into face-to-face contact with one another to form a composite layer, and (4) forming from said composite layer within said coating zone a free-falling vertical curtain which extends transversely of said path and impinges on said moving object forming thereon a coating comprised of a plurality of distinct superposed layers of said coating compositions.

2. The method as described in claim 1 wherein each individual layer flows in a downwardly inclined direction so that it will be accelerated by gravity at a rate less than acceleration in free fall to thereby minimize thickness variations.

3. The method as described in claim 1 wherein the flowing layers are formed by continuously metering the respective coating compositions through respective elongated slots onto respective downwardly inclined slide surfaces down which the layers flow by gravity, said inclined slide surfaces being disposed one above the other in substantially coplanar relation and the lowermost inclined slide surface terminating in a lip; the layer formed on each inclined slide surface other than the lowermost inclined slide surface is directed into superposed surface contact with the top of the layer flowing on the next lower inclined slide surface to thereby form the composite layer; and the composite layer is directed over said lip on said lowermost inclined slide surface to form the free-falling vertical curtain.

4. A method of making a photographic element comprising a support coated with a plurality of layers of photographic coating compositions, comprising the steps of (1) moving said support along a path through a coating zone, (2) forming a plurality of flowing layers of liquid photographic coating compositions, (3) flowing said layers into face-to-face contact with one another to form a composite layer, and (4) forming from said composite layer within said coating zone a free-falling vertical curtain which extends transversely of said path and impinges on the face of said support to deposit thereon a coating comprised of a plurality of distinct superposed layers; said curtain having a uniform flow rate over substantially all of such portion of its width as is coextensive with said support, the total flow rate of coating composition forming said curtain being at least about 0.5 cubic centimeter per second per centimeter of curtain width, and the ratio of the flow rate of coating composition forming any individual layer within said curtain, measured in cubic centimeters per second per centimeter of curtain width, to the velocity of said support, measured in centimeters per second, being less than about 0.015.

5. The method as described in claim 4 wherein each individual layer flows in a downwardly inclined direction so that it will be accelerated by gravity at a rate less than acceleration in free fall to thereby minimize thickness variations.

6. The method as described in claim 4 wherein the flowing layers are formed by continuously metering the respective coating compositions through respective elongated slots onto respective downwardly inclined slide surfaces down which the layers flow by gravity, said inclined slide surfaces being disposed one above the other in substantially coplanar relation and the lowermost inclined slide surface terminating in a lip; the layer formed on each inclined slide surface other than the lowermost inclined slide surface is directed into superposed surface contact with the top of the layer flowing on the next lower inclined slide surface to thereby form the composite layer; and the composite layer is directed over said lip on said lowermost inclined slide surface to form the free-falling vertical curtain.

7. The method as described in claim 4 wherein the moving support is in the form of discrete sheets.

8. The method as described in claim 4 wherein the moving support is a continuous web.

9. The method as described in claim 4 wherein a surfactant is incorporated in at least one of the outer layers of said free-falling vertical curtain to reduce the surface tension of the coating composition therein and thereby increase the stability of said free-falling vertical curtain.

10. The method as described in claim 4 wherein the height of the free-falling vertical curtain is from about 5 centimeters to about 20 centimeters.

11. The method as described in claim 4 wherein the downward velocity of coating composition along the line where free fall commences is less than about 20 centimeters per second.

12. The method as described in claim 4 wherein the downward velocity of coating composition along the line where free fall commences is less than about 10 centimeters per second.

13. The method as described in claim 4 further comprising the step of reducing the thickness of the boundary layer of air on the face of the moving support immediately before the free-falling vertical curtain impinges thereon.

14. The method as described in claim 4 further comprising the step of guiding the vertical free-falling curtain along its longitudinal edges to define its width at impingement onto the face of the support.

15. The method as described in claim 4 further comprising the step of wetting the face of the support before the free-falling vertical curtain impinges thereon.

16. The method as described in claim 4 wherein the moving support is rigidly supported as it passes through the coating zone.

17. The method as described in claim 4 wherein the individual layers are all composed of the same coating composition.

18. The method as described in claim 4 wherein the individual layers are composed of at least two different coating compositions.

19. The method as described in claim 4 wherein at least one of the individual layers is composed of a silver halide/gelatin emulsion.

20. The method as described in claim 4 wherein the support is photographic film base.

21. The method as described in claim 4 wherein the support is photographic paper.

22. The method as described in claim 4 wherein the two outer layers of the free-falling vertical curtain are composed of the same coating composition.

23. The method as described in claim 4 wherein the two outer layers of the free-falling vertical curtain are composed of coating compositions of substantially the same surface tension.

24. The method as described in claim 4 wherein one layer comprises a protein and an aldehyde and a layer adjacent thereto comprises a protein and ammonia whereby both of said layers are caused to set simultaneously as a result of chemical reaction occurring therebetween following impingement of the free-falling vertical curtain onto the moving support.

References Cited

UNITED STATES PATENTS

| | | | |
|---|---|---|---|
| 2,761,791 | 9/1956 | Russell | 117—83 X |
| 2,898,882 | 8/1959 | Beck | 117—34 X |
| 3,205,089 | 9/1965 | Kinzelman | 117—105.3 |
| 3,345,972 | 10/1967 | Masulis | 118—324 X |
| 3,206,323 | 9/1965 | Miller | 117—83 X |

FOREIGN PATENTS 1,030,178   5/1958   Germany.

WILLIAM D. MARTIN, Primary Examiner

W. R. TRENOR, Assistant Examiner

U.S. Cl. X.R.

53—140; 117—62.1, 62.2, 76, 83, 105.3, 120; 118—324